US012153851B2

(12) United States Patent
Li

(10) Patent No.: US 12,153,851 B2
(45) Date of Patent: Nov. 26, 2024

(54) MEETING CONTROL METHOD AND APPARATUS, DEVICE, AND MEDIUM

(71) Applicant: TENCENT TECHNOLOGY (SHENZHEN) COMPANY LIMITED, Shenzhen (CN)

(72) Inventor: Yang Li, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 17/948,956

(22) Filed: Sep. 20, 2022

(65) Prior Publication Data
US 2023/0017859 A1    Jan. 19, 2023

Related U.S. Application Data

(63) Continuation of application No. PCT/CN2021/126615, filed on Oct. 27, 2021.

(30) Foreign Application Priority Data

Nov. 24, 2020   (CN) .......................... 202011329052.5

(51) Int. Cl.
*G06F 3/048*        (2013.01)
*G06F 3/0482*       (2013.01)
(Continued)

(52) U.S. Cl.
CPC .......... *G06F 3/1454* (2013.01); *G06F 3/0482* (2013.01); *H04L 65/65* (2022.05)

(58) Field of Classification Search
CPC .... G06F 3/1454; G06F 3/0482; G06F 3/0488; G06F 3/0481; H04L 65/65; H04L 65/403;
(Continued)

(56) References Cited

U.S. PATENT DOCUMENTS

2017/0357917 A1*   12/2017   Holmes ............. G06Q 10/1095
2020/0412564 A1*   12/2020   Roedel ................ H04L 12/1818

FOREIGN PATENT DOCUMENTS

CN          104935624    *   9/2015   ............. H04L 67/08
CN          104935624 A      9/2015
(Continued)

OTHER PUBLICATIONS

The World Intellectual Property Organization (WIPO) International Search Report for PCT/CN2021/126615 Dec. 22, 2021 6 Pages (including translation).

*Primary Examiner* — Towfiq Elahi
(74) *Attorney, Agent, or Firm* — ANOVALAW GROUP PLLC

(57) ABSTRACT

A meeting control method includes: displaying one or more meeting presentation portals in a shared content selection page of a meeting application; determining, in response to a trigger operation on the one or more meeting presentation portals, a meeting presentation portal triggered by the trigger operation as a target meeting presentation portal, and determining an application corresponding to the target meeting presentation portal as a target application; and sharing and projecting, in the meeting application, only a target interface content in the target application based on protocol parameters of the meeting application and the target application in response to receipt success information transmitted by the target application, the target interface content being content that the meeting application has a permission of sharing and projection.

19 Claims, 10 Drawing Sheets

(51) Int. Cl.
*G06F 3/14* (2006.01)
*H04L 65/65* (2022.01)

(58) Field of Classification Search
CPC ........... G09G 2354/00; G09G 2358/00; G09G 2370/022; G09G 2370/025
See application file for complete search history.

(56) References Cited

FOREIGN PATENT DOCUMENTS

| | | |
|---|---|---|
| CN | 110134356 A | 8/2019 |
| CN | 110708494 A | 1/2020 |
| CN | 110995923 A | 4/2020 |

* cited by examiner

MEETING CONTROL METHOD AND APPARATUS, DEVICE, AND MEDIUM

RELATED APPLICATION(S)

This application is a continuation application of PCT Patent Application No. PCT/CN2021/126615 filed on Oct. 27, 2021, which claims priority to Chinese Patent Application No. 2020113290525, entitled "MEETING CONTROL METHOD AND APPARATUS, DEVICE, AND MEDIUM" and filed with the China National Intellectual Property Administration on Nov. 24, 2020, all of which are incorporated herein by reference in entirety.

FIELD OF THE TECHNOLOGY

The present disclosure relates to the field of Internet technologies, and in particular, to a meeting control method and apparatus, a device, and a medium.

BACKGROUND

With the development of multimedia technology and the emergence of various social software, users use communication applications for life and work communications. For example, meeting applications have become a part of daily communications of users because multi-person remote video/voice communications can be achieved.

In some meeting scenes of a meeting application, when a user presents in a browser during a meeting process, the user may enable a screen sharing function in the meeting application for projecting and displaying a presentation operation of the user in the browser in the meeting application, whereby the remaining users participating in the meeting may all see the presentation operation of the user in the browser.

SUMMARY

Embodiments of the present disclosure provide a meeting control method and apparatus, a device, and a medium, which can improve the privacy of user privacy data during meeting presentation.

In one aspect, the present disclosure provides a meeting control method, including: displaying one or more meeting presentation portals in a shared content selection page of a meeting application in response to an enable operation of a screen sharing function option, each meeting presentation portal corresponding to an application other than the meeting application, the meeting application and each of the other applications pre-customizing a protocol parameter for sharing and projecting each of the other applications in the meeting application; determining, in response to a trigger operation on the one or more meeting presentation portals, a meeting presentation portal triggered by the trigger operation as a target meeting presentation portal, and determining an application corresponding to the target meeting presentation portal as a target application; and sharing and projecting, in the meeting application, only a target interface content in the target application based on protocol parameters of the meeting application and the target application in response to receipt success information transmitted by the target application, the target interface content being content that the meeting application has a permission of sharing and projection.

In another aspect, the present disclosure provides a meeting control apparatus, including: a memory storing computer program instructions; and a processor coupled to the memory and configured to execute the computer program instructions and perform: displaying one or more meeting presentation portals in a shared content selection page of a meeting application in response to an enable operation of a screen sharing function option, each meeting presentation portal corresponding to an application other than the meeting application, the meeting application and each of the other applications pre-customizing a protocol parameter for sharing and projecting each of the other applications in the meeting application; determining, in response to a trigger operation on the one or more meeting presentation portals, a meeting presentation portal triggered by the trigger operation as a target meeting presentation portal, and determining an application corresponding to the target meeting presentation portal as a target application; and sharing and projecting, in the meeting application, only a target interface content in the target application based on protocol parameters of the meeting application and the target application in response to receipt success information transmitted by the target application, the target interface content being content that the meeting application has a permission of sharing and projection.

In yet another aspect, the present disclosure provides a non-transitory computer-readable storage medium storing computer program instructions executable by at least one processor to perform: displaying one or more meeting presentation portals in a shared content selection page of a meeting application in response to an enable operation of a screen sharing function option, each meeting presentation portal corresponding to an application other than the meeting application, the meeting application and each of the other applications pre-customizing a protocol parameter for sharing and projecting each of the other applications in the meeting application; determining, in response to a trigger operation on the one or more meeting presentation portals, a meeting presentation portal triggered by the trigger operation as a target meeting presentation portal, and determining an application corresponding to the target meeting presentation portal as a target application; and sharing and projecting, in the meeting application, only a target interface content in the target application based on protocol parameters of the meeting application and the target application in response to receipt success information transmitted by the target application, the target interface content being content that the meeting application has a permission of sharing and projection.

In yet another aspect, the present disclosure provides a computing device, including a memory and a processor, the memory storing a computer program, the computer program, when executed by the processor, causing the processor to perform the operations of the method in this embodiment of the present disclosure.

In yet another aspect, the present disclosure provides a computer program product or a computer program, the computer program product or the computer program including computer instructions, the computer instructions being stored in a computer-readable storage medium. A processor of a computing device reads the computer instructions from the computer-readable storage medium and executes the computer instructions to cause the computing device to perform the method provided in various optional manners of the aspect.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

In some meeting scenes of a meeting application, when a user presents in a browser during a meeting process, the user may enable a screen sharing function in the meeting application for projecting and displaying a presentation operation of the user in the browser in the meeting application, whereby the remaining users participating in the meeting may all see the presentation operation of the user in the browser. However, after the user enables the screen sharing function, the entire terminal screen of the user will be shared and projected into the meeting application, thereby causing that the content which does not have to be presented in the meeting application will also be shared and projected into the meeting application (for example, a document file opened by the user in the terminal, a display page of the remaining communication applications except for the meeting application, etc.). Personal privacy information of the user is easily revealed.

Figure 1:
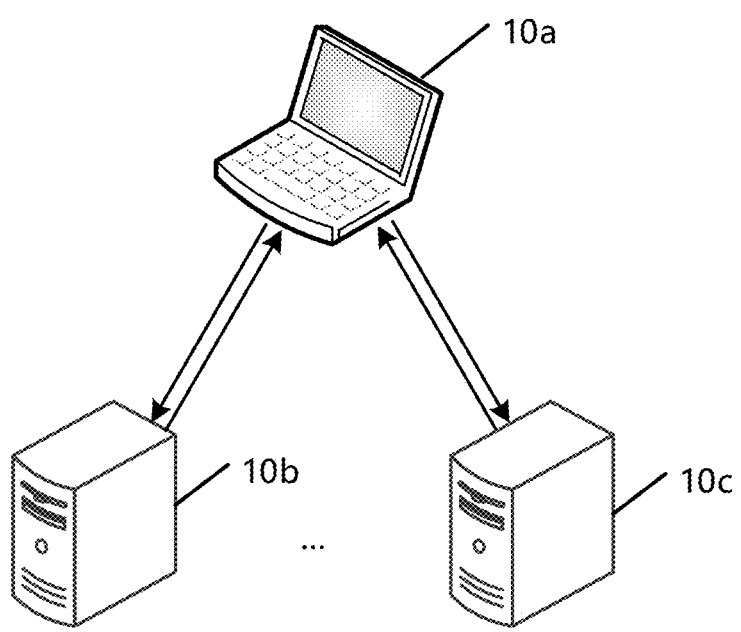
FIG. 1 is a schematic structural diagram of a network architecture according to an embodiment of the present disclosure.

FIG. 1 is a schematic structural diagram of a network architecture according to an embodiment of the present disclosure. As shown in FIG. 1, the network architecture may include a user terminal 10*a*, a server 10*b*, a server 10*c*, etc. The network architecture may include one or more user terminals and may further include at least two servers. The number of user terminals and servers will not be limited here. As shown in FIG. 1, the user terminal 10*a* may be connected to the server 10*b* and the server 10*c*, etc., over a network respectively, whereby the user terminal 10*a* may perform data exchange with the server through the network connection.

The user terminal 10*a* as shown in FIG. 1 may include: a smart phone, a tablet computer, a notebook computer, a palmtop computer, a mobile Internet device (MID), a wearable device (for example, a smart watch, a smart band, etc.), a smart television, and other smart devices having an application installation function. The server 10*b* and the server 10*c* may be independent physical servers, may also be server clusters or distributed systems composed of a plurality of physical servers, and may also be cloud servers providing basic cloud computing services, such as a cloud service, a cloud database, cloud computing, a cloud function, cloud storage, a network service, cloud communication, a middleware service, a domain name service, a security service, a CDN, and a large data and AI platform.

An application is installed on the user terminal 10*a*. The application may include a meeting application, an instant messaging application, a multimedia application (for example, a video application, a music application, a broadcast application, etc.), an entertainment application (for example, a game application, etc.), an education application, a browser, etc. The server 10*b* and the server 10*c* as shown in FIG. 1 may be backend servers corresponding to different applications installed in the user terminal 10*a*. For the convenience of description, in the following example, a meeting application and a browser are installed on the user terminal 10*a*. At this moment, the server 10*b* may be a backend server corresponding to the meeting application, and the server 10*c* may be a backend server corresponding to the browser. When a user (for example, user A) using the user terminal 10*a* may enable a meeting application in the user terminal 10*a* to hold an on-line meeting with other users in the meeting application. The respective users participating in the on-line meeting may perform interactive communication via data exchange between user terminals used respectively and the server 10*b*. If user A performs meeting presentation in a browser during a meeting process, user A may trigger a browser presentation portal built in a meeting application, and start a browser according to a pre-customized protocol parameter between the meeting application and the browser. When user A confirms the security of privacy information in the browser, a meeting presentation mode may be enabled in the browser. That is, all operations of user A in the browser may be shared and projected in the meeting application. All the operations of user A outside the browser will not be shared and projected in the meeting application. In this way, the security of the privacy information of user A can be effectively guaranteed. When user A executes the presentation operation in the browser, the user terminal 10a may monitor the presentation operation of user A in the browser, and perform data exchange with the server 10c. An interface content corresponding to the presentation operation in the browser is displayed, and the interface content in the meeting application is shared and projected.

Figure 2:
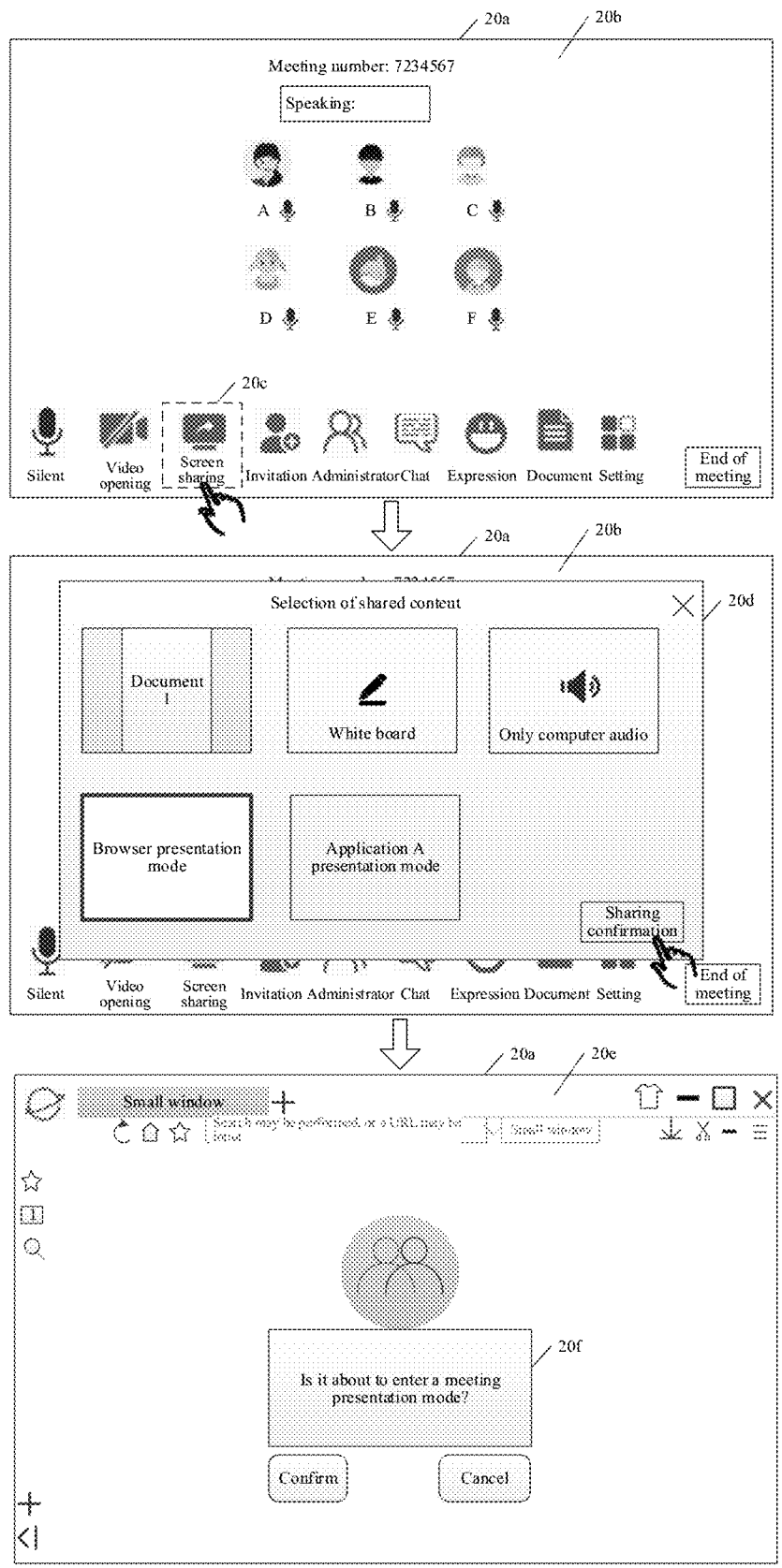
FIG. 2 is a schematic diagram of a browser meeting presentation scenario according to an embodiment of the present disclosure.

Reference is made to FIG. 2. FIG. 2 is a schematic diagram of a browser meeting presentation scenario according to an embodiment of the present disclosure. As shown in FIG. 2, when a plurality of users in different territories perform work communication, a meeting may be created in a meeting application (a user creating the meeting may be referred to as a meeting creator). After the meeting is created, the meeting creator may transmit invitation information to the remaining users so as to invite the remaining users to join the meeting. The invitation information may include information such as a meeting time, a meeting link and a meeting number. The remaining users may join the meeting via the invitation information transmitted by the meeting creator. For example, after creating a meeting with a meeting number 123456 in a meeting application, user A may invite user B, user C, user D, user E, and user F to join the meeting.

When a user (for example, user B) of a user terminal 20a receives meeting invitation information transmitted by user A, the user may join the meeting with the meeting number 123456 via the meeting invitation information. When user B executes a click operation on a meeting link in the meeting invitation information, the user terminal 20a may allow the user B to join the meeting in response to the click operation on the meeting link. In certain embodiment(s), user B may also enter the meeting number 123456 in the meeting application to request to join the meeting. After user B joins the meeting, a session page 20b of the meeting may be displayed in a terminal screen of the user terminal 20a, and the session page 20b may display a meeting number of the meeting: 123456, user information of all users participating in the meeting (for example, head portraits, nicknames, video pictures, and other information of user A, user B, user C, user D, user E, and user F), function options in the meeting application, etc. The function options may include a voice function option, a video function option, a screen sharing function option, an invitation function option, a chat function option, an expression function option, a document function option, a setting function option, etc. The voice function option may be used for switching an enable state and a disable state of a voice function. When the voice function is in the enable state, the user terminal 20a may collect a voice from user B and a voice in a surrounding environment. That is, when user B speaks, the users in the meeting may all listen to the voice of user B. When the voice function is in the disable state, the user terminal 20a stops collecting voice data. That is, all the users except user B in the meeting cannot hear the voice of user B. For example, user A, user B, user C, user D, user E, and user F in the meeting all enable the voice function. The video function option may be used for switching an enable state and a disable state of a video function. When the video function is in the enable state, the user terminal 20a may collect a real-time environment picture of user B via a camera. At this moment, the real-time environment picture of user B (for example, an image containing a face of user B) may be displayed in the session page 20b, and all users in the meeting may see a real-time environment where user B is located. When the video function is in the disable state, the user terminal 20a does not collect the real-time environment picture of user B. That is, all the users in the meeting cannot see the real-time environment picture of user B. At this moment, head portrait information of user B pre-stored in the meeting application is displayed in the session page 20b. The screen sharing function option is used for switching an enable state and a disable state of a screen sharing function. When the screen sharing function is in the enable state, an interface display content of some applications in the user terminal 20a may be shared and projected in the meeting, and the interface display content of some applications in the user terminal 20a may be shared to the other users. When the screen sharing function is in the disable state, the meeting application cannot share and project the interface display content in the user terminal 20a. The invitation function option may be used for inviting a user to join the meeting. The chat function option may be used for enabling a chat function in the meeting. User B may also trigger the document function option to upload documents which may be shared to the remaining users in the meeting, etc.

During a meeting, if user B performs meeting presentation in a browser so as to more intuitively present contents to be represented by user B to the remaining users participating in the meeting, user B may perform an enable operation on a screen sharing function option 20c in the session page 20b, and share and project a browser interface content in the user terminal 20a in a target meeting, whereby the remaining users participating in the meeting may all see the browser interface content in the user terminal 20a.

When user B executes an enable operation on the screen sharing function option 20c, the user terminal 20a may display, in response to the enable operation of user B on the screen sharing function option 20c, a shared content selection page 20d in the session page 20b and display a meeting presentation portal built in the meeting application in the shared content selection page 20d. There may be one or more meeting presentation portals. The number of meeting presentation portals is not limited in the embodiments of the present disclosure. As shown in FIG. 2, the meeting presentation document included in the meeting application may include a document meeting presentation portal, a white board meeting presentation portal, a computer audio-shared meeting presentation portal, a browser presentation mode portal, an application A presentation mode portal, etc. Each meeting presentation portal may correspond to an application other than the meeting application. For example, an application indicated by the document meeting presentation portal is a word application, an application indicated by the white board meeting presentation portal is a text editing application, an application indicated by the computer audio-shared meeting presentation portal is an audio application, an application indicated by the browser presentation mode portal is a browser, an application indicated by the application A presentation mode portal is application A, etc. User B may select a meeting presentation portal desirable in the shared content selection page 20d and confirm to share, so as to start the application indicated by the selected meeting presentation portal in the user terminal 20a, and share and project an interface content of the application indicated by the selected meeting presentation portal in the meeting application. The meeting application may pre-customize protocol parameters with the application indicated by each meeting presentation portal, and establish a meeting communication connection between the meeting application and the application indicated by each meeting presentation portal. That is, the application indicated by each meeting presentation portal has a permission of sharing and projection for the meeting application.

As shown in FIG. 2, when user B desires to perform meeting presentation in a browser, the user may select a browser presentation mode portal from one or more meeting presentation portals displayed on the shared content selection page 20d and confirm to share. At this moment, the user terminal 20a may acquire protocol parameter information for the browser in a meeting application and transmit the protocol parameter information to the browser in the user terminal 20a. If a browser has been installed in the user terminal 20a, the protocol parameter information in the meeting application may be directly transmitted to the installed browser, the browser may identify the received protocol parameter information. Upon detecting that the received protocol parameter information is a pre-customized protocol parameter between the meeting application and the browser, the browser may be opened in the user terminal 20a. If a browser has not been installed in the user terminal 20a, browser installation prompt information may be displayed in the terminal screen of the user terminal 20a (for example, the browser installation prompt information may be "No browser is detected, and whether to immediately install a browser"). After user B confirms the browser installation prompt information, the browser may be installed in the user terminal 20a. After the browser is installed, the user terminal 20a may transmit the protocol parameter information in the meeting application to the installed browser. Upon detecting that the received protocol parameter information is a pre-customized protocol parameter between the meeting application and the browser, the installed browser may be opened in the user terminal 20a.

Further, when a browser is opened, there are usually two scenarios: Before user B triggers a browser presentation mode portal in a meeting application, no window has been opened in the browser. At this moment, the browser may open a new window according to the protocol parameter information, such as a window 20e shown in FIG. 2, and meeting presentation prompt information 20f (for example, "Is it about to enter a meeting presentation mode?") may be displayed in the browser. If user B executes a confirmation operation on the meeting presentation prompt information 20f, the browser may return receipt success information to the meeting application. After receiving the receipt success information returned by the browser, the meeting application may share and project the window 20e in the browser. That is, the operation presentation process of user B in the browser may be displayed to the remaining users (for example, user A, user C, user D, user E, user F, etc.) participating in the meeting by sharing and projection. If user B executes a cancel operation on the meeting presentation prompt information 20f, the browser may return receipt failure information to the meeting application. After receiving the receipt failure information returned by the browser, the meeting application may cancel the sharing and projection of the browser.

In some embodiments, before user B triggers the browser presentation mode portal in the meeting application, no window has been opened in the browser. Receipt success information may be directly returned to the meeting application. After the meeting application receives the receipt success information of the browser, the interface content in the browser may be shared and projected in the meeting application. That is, it is unnecessary to display the meeting presentation prompt information 20f in the browser.

In some embodiments, before user B triggers the browser presentation mode portal in the meeting application, an opened window already exists in the browser. In order to guarantee the security of personal information of user B, meeting presentation prompt information may be displayed in the browser, and user B may confirm whether to directly present according to actual situations, or perform meeting presentation after closing the opened window. When user B considers that the opened window does not involve personal privacy information and may perform sharing and projection in the meeting application, user B may execute a confirmation operation on the meeting presentation prompt information, and the browser may return receipt success information to the meeting application. After receiving the receipt success information returned by the browser, the opened browser in the browser may be shared and projected. When user B considers that the opened window involves personal privacy information, user B may execute a cancel operation on the meeting presentation prompt information, and the browser may return receipt failure information to the meeting application. After receiving the receipt failure information returned by the browser, the sharing and projection of the browser may be canceled. After closing the opened window in the browser, user B may re-trigger the screen sharing function option 20c in the meeting application, the above operation flow is performed, and the browser is shared and projected in the meeting application.

In the embodiments of the present disclosure, since user B triggers a browser presentation mode portal, after receiving the receipt success information of the browser, the meeting application may share and project the window in the browser in the meeting application, while the remaining contents other than the browser cannot be shared and projected in the meeting application. Thus, the privacy of personal privacy information of user B can be improved.

Figure 3:
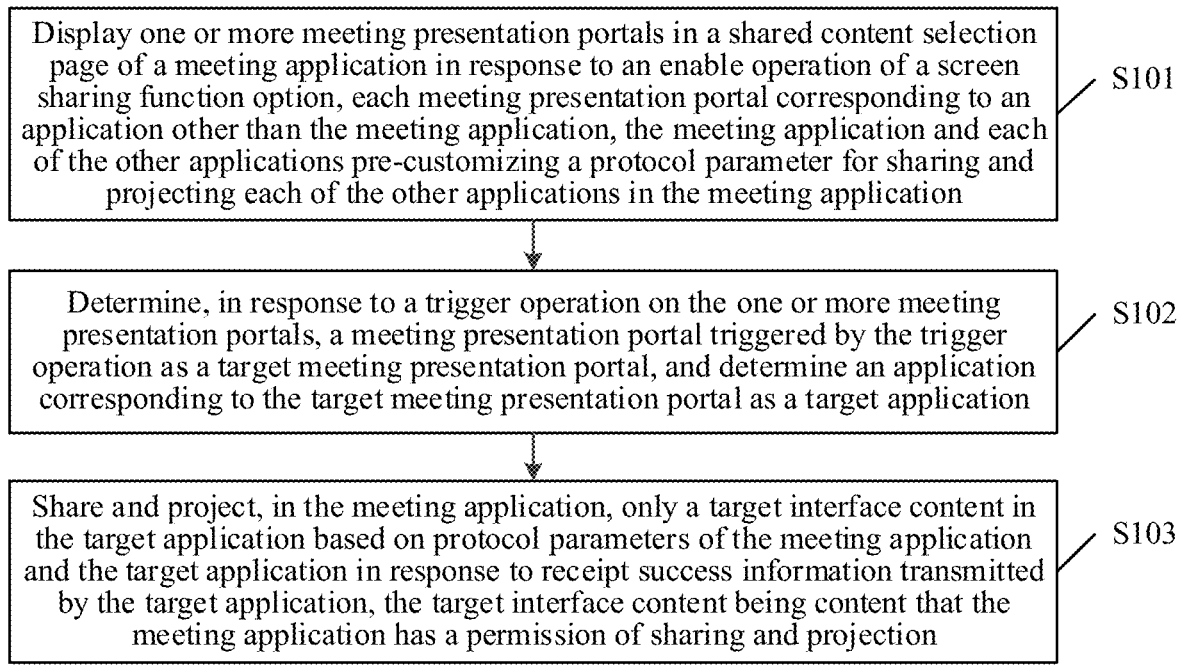
FIG. 3 is a schematic flowchart of a meeting control method according to an embodiment of the present disclosure.

FIG. 3 is a schematic flowchart of a meeting control method according to an embodiment of the present disclosure. It is to be understood that the meeting control method may be performed by a computing device. The computing device may be a user terminal (such as the user terminal 20a in the embodiment corresponding to FIG. 2 described above), or a server, or a system composed of a user terminal and a server. This is not particularly limited in the present disclosure. As shown in FIG. 3, the meeting control method may include the following steps:

Step S101: Display one or more meeting presentation portals in a shared content selection page of a meeting application in response to an enable operation of a screen sharing function option. Each meeting presentation portal corresponds to an application other than the meeting application. The meeting application and each of the other applications pre-customize a protocol parameter for sharing and projecting each of the other applications in the meeting application.

In certain embodiment(s), when a plurality of users participate in an on-line meeting in a meeting application, a device used by each user participating in the meeting may display a session page (such as the session page 20b in the embodiment corresponding to FIG. 2 described above) corresponding to the meeting. The session page may display information such as basic information of the meeting (for example, a meeting number), basic information of users participating in the meeting (for example, nicknames, head portraits and video pictures of people participating in the meeting), and a function menu bar provided by the meeting application. The function menu bar may include a voice function option, a video function option, a screen sharing function option, an invitation function option, and other function options. When a participant of the meeting executes a trigger operation on the screen sharing function option in the function menu bar in the session page of the meeting, a device used by the participant (at this moment, the participant may be referred to as an author, and the device used by the author may be referred to as a computing device) may display a shared content selection page in the session page in response to the trigger operation on the screen sharing function option. One or more meeting presentation portals may be displayed in the shared content selection page (such as a meeting presentation portal displayed in the shared content selection page 20d in the embodiment corresponding to FIG. 2 described above). Each meeting presentation portal may correspond to an application, and protocol parameters may be pre-customized both for the meeting application and the application indicated by each meeting presentation portal. The pre-customized protocol parameters may be used for sharing and projecting the applications indicated by the meeting presentation portals in the meeting application. It is to be understood that the shared content selection page may be a sub-page that is independently displayed in the session page, or a region in the session page. The form in which the shared content selection page is displayed in the session page will not be limited here.

Figure 4:
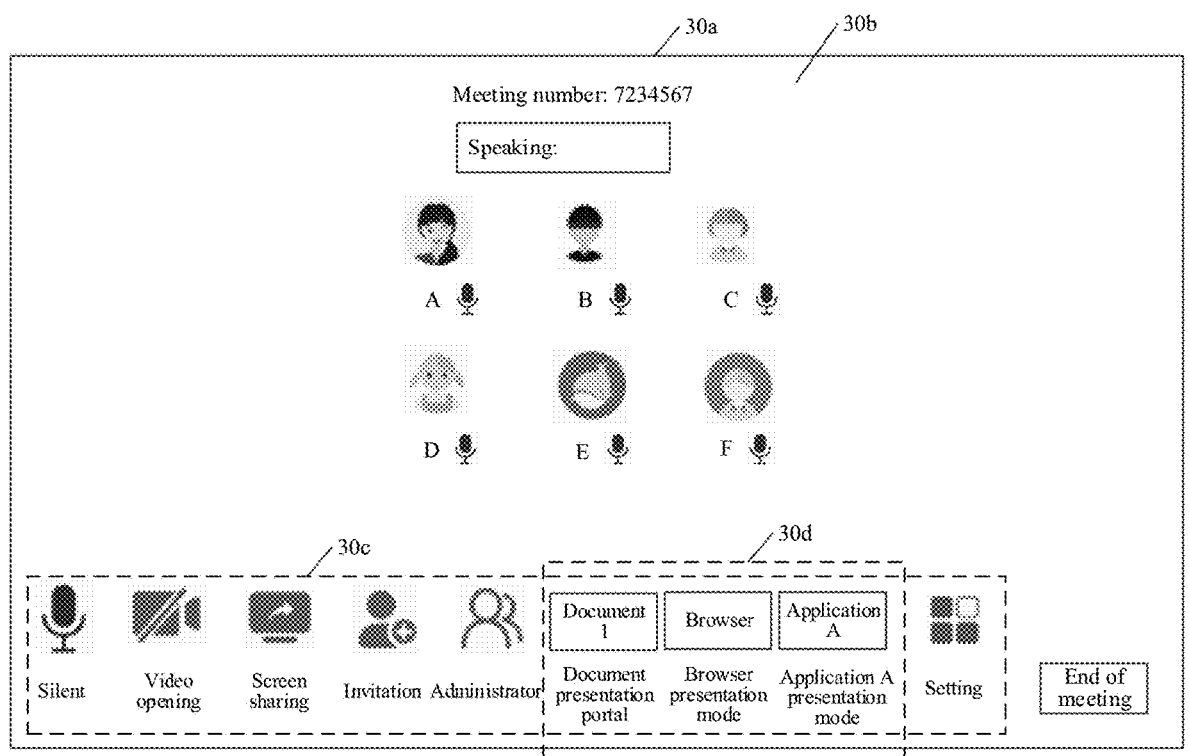
FIG. 4 is a diagram of a display interface of a meeting presentation portal according to certain embodiment(s) of the present disclosure.

In some embodiments, one or more meeting presentation portals in the meeting application may be displayed directly in the function menu bar of the session page. Reference is made to FIG. 4. FIG. 4 is a diagram of a display interface of a meeting presentation portal according to an embodiment of the present disclosure. As shown in FIG. 4, a user terminal 30a may be a user terminal used by any participant in a meeting. A meeting number, basic information of participants in the meeting and a function menu bar 30c may be displayed in a session page 30b of the meeting. One or more meeting presentation portals may be displayed in the function menu bar 30c. As shown in FIG. 4, a document presentation portal, a browser presentation mode portal, an application A presentation mode portal, etc. may be displayed in a region 30d of the function menu bar 30c. When a participant in the meeting desires to perform meeting presentation within an application other than a target meeting, an appropriate meeting presentation portal may be directly selected in the function menu bar 30c and an application indicated by the selected meeting presentation portal may be started.

Step S102: Determine, in response to a trigger operation on the one or more meeting presentation portals, a meeting presentation portal triggered by the trigger operation as a target meeting presentation portal, and determine an application corresponding to the target meeting presentation portal as a target application.

In certain embodiment(s), an author in the meeting may select a meeting presentation portal for desired presentation among the one or more meeting presentation portals. When the author executes a trigger operation on the one or more meeting presentation portals, a computing device may determine, in response to the trigger operation on the one or more meeting presentation portals, a meeting presentation portal triggered by the author as a target meeting presentation portal, and determine an application indicated by the target meeting presentation portal as a target application. The target application may be any application other than the meeting application in the computing device. For example, the target application may include a browser, a multimedia application, an instant messaging application, an office application (for example, word office software, excel office software, slide office software, etc.), a programming application, etc.

If the meeting application includes only one meeting presentation portal, the author may only trigger the meeting presentation portal when performing meeting presentation, and the meeting presentation portal may be determined as a target meeting presentation portal. If the meeting application includes a plurality of meeting presentation portals, the author may select an appropriate meeting presentation portal from the plurality of meeting presentation portals, and the meeting presentation portal selected by the author from the plurality of meeting presentation portals may be determined as a target meeting presentation portal. As shown in FIG. 2, when user B (author) selects a browser presentation mode portal in the shared content selection page 20d, the user terminal 20a (computing device) may determine the browser presentation mode portal selected by user B as a target meeting presentation portal and determine the browser indicated by the browser presentation mode portal as a target application.

In some embodiments, after the author selects a meeting presentation portal in the meeting application and confirms to share, the computing device may acquire protocol parameter information corresponding to the target meeting presentation portal in the meeting application, and transmit the protocol parameter information to the target application. After receiving the protocol parameter information transmitted by the meeting application, the target application may identify the protocol parameter information. It may be determined whether the meeting application has a permission of sharing and projecting the target application according to an identification result of the protocol parameter information, i.e. detected whether the protocol parameter information received by the target application is consistent with a pre-customized protocol parameter. If the received protocol parameter information is consistent with the pre-customized protocol parameter, it may be determined that the meeting application may start the target application via the target meeting presentation portal, and has a permission of sharing and projecting the target application. If the received protocol parameter information is inconsistent with the pre-customized protocol parameter, it may be determined that the meeting application cannot start the target application via the target meeting presentation portal, and does not have a permission of sharing and projecting the target application. When the target application determines that the meeting application has a permission of sharing and projection, the target application may enter a meeting mode at this moment, and a meeting presentation mode associated with the target meeting presentation portal may be displayed in the target application.

The protocol parameter information may include a mode declaration parameter, an identity declaration parameter, a source declaration parameter, etc. The mode declaration parameter may be represented as mode=meeting, for indicating that the target application may start entering a meeting mode. The meeting mode here may be understood as a mode of enabling the target application from the meeting application (also referred to as starting the target application). It is to be understood that the target application may also include a non-meeting mode, which may be understood as a mode of starting the target application via a non-meeting application, for example, by triggering an icon of the target application, or by triggering a link in the non-meeting application, etc. The identity declaration parameter may be used for indicating identity information of a user (i.e. author) wanting to perform meeting presentation. For example, the identity declaration parameter may be represented as author=A, indicating that an author is A. The source declaration parameter may be used for indicating a specific name of a meeting application performing meeting presentation. For example, the source declaration parameter may be represented as from (source)=tencent meeting, indicating that the meeting application enabling the target application may be a tencent meeting.

In some embodiments, in addition to the above mode declaration parameter, identity declaration parameter and source declaration parameter, the protocol parameter information may add extended parameters based on implementations. Extended parameters of a personal computer (PC) and a mobile terminal (e.g. a smart phone) may be different. The extended parameter of the PC may include an access path of a target application in the PC, and the above mode declaration parameter, identity declaration parameter and source declaration parameter. The extended parameter of the mobile terminal may be understood as transfer of the above mode declaration parameter, identity declaration parameter and source declaration parameter using an intent. putextra( )method (method for transmitting data in an operating system of the mobile terminal). For example, the extended parameter of the PC may be represented as: "D:\Program Files\Tencent\Browser\Browser.exe"-mode=meeting&author=AA&from=xxx meeting, indicating that the target application is a browser, an author is AA, the name of a meeting application is a xxx meeting, and an access path of the target application on the PC is "D:\Program Files\Tencent\Browser\Browser.exe". The extended parameter of the mobile terminal may be represented as: intent.putextra(mode, meeting); intent.putextra(author, AA); intent.putextra(from, xxx meeting). The extended parameter represents that a mode declaration parameter (mode, meeting), an identity declaration parameter (author, AA), and a source declaration parameter (from, xxx meeting) may be transferred using an intent.putextra( ) method.

The meeting presentation modes displayed in the target application may include a general presentation mode, a separate presentation mode, an independent presentation mode, etc. The general presentation mode may mean that each computing device may create an independent meeting identity without distinguishing sources (from) and without distinguishing authors. The general presentation mode may be applicable to personal devices frequently used and may guarantee device privacy. The separate presentation mode may mean that each computing device creates an identity according to a source (from). That is, different meeting applications may correspond to different directories. For example, relevant data presented by meeting application A and meeting application B in a target application may be separately stored in different directories of the computing device. One meeting application corresponds to one storage directory. The separate presentation mode may be applicable to computing devices which frequently use different meeting tools to participate in various meetings, and may guarantee device privacy. The independent presentation mode may mean that each computing device creates an identity according to an author. That is, different authors may correspond to different directories. For example, relevant data presented by author 1 and author 2 in a target application may be separately stored in different directories of the computing device. One author corresponds to one directory. The independent presentation mode may be applicable to computing devices shared by multiple users, and may guarantee the privacy of personal information.

In some embodiments, after the author executes a selection operation on the meeting presentation mode displayed in the target application, the computing device may display meeting presentation prompt information (such as the meeting presentation prompt information $20f$ in the embodiment corresponding to FIG. 2 described above) in the target application in response to the selection operation on the meeting presentation mode. The meeting presentation prompt information is used for prompting a user to confirm an information security state of an opened page in the target application. After the meeting presentation prompt information is displayed in the target application, the author may confirm the interface content in the target application. If the author confirms that the interface content in the target application does not involve personal information privacy, a confirmation operation may be executed on the meeting presentation prompt information. At this moment, the computing device may generate receipt success information in the target application in response to the confirmation operation on the meeting presentation prompt information, and transmit the receipt success information to the meeting application. After the meeting application receives the receipt success information of the target application, the target interface content in the target application may be shared and projected. If the author confirms that the interface content in the target application involves personal information privacy, the author may execute a cancel operation on the meeting presentation prompt information. At this moment, the computing device may generate receipt failure information in the target application in response to the cancel operation on the meeting presentation prompt information, and transmit the receipt failure information to the meeting application. After the meeting application receives the receipt failure information transmitted by the target application, the sharing and projection of the target application may be canceled in the meeting application. In some embodiments, if the interface content in the target application involves personal privacy information, the author may directly close an interface to which the interface content belongs in the target application. After the interface involving the personal privacy information is closed, a confirmation operation is executed on the meeting presentation prompt information. At this moment, the target application may also transmit the receipt success information to the meeting application. The target application may be shared and projected in the meeting application, without executing a series of operations such as a cancel operation on the meeting presentation prompt information and an operation of re-triggering a meeting presentation portal from the meeting application and confirming. The enable efficiency of meeting presentation can be improved.

In some embodiments, after the author executes a selection operation on the meeting presentation mode displayed in the target application, if the computing device detects that there is no interface opened in the target application, for example, the target application only contains a current blank interface, meeting presentation prompt information may be displayed in the target application, or the meeting presentation prompt information is not displayed in the target application (that is, it is unnecessary for the author to confirm the interface content of the target application). The operation flow of displaying meeting presentation prompt information in the target application is as described above. When meeting presentation prompt information is not displayed in the target application, receipt success information may be directly generated in the target application, and the receipt success information may be transmitted to the meeting application. After the meeting application receives the receipt success information of the target application, the target interface content in the target application may be shared and projected so as to improve meeting presentation efficiency.

It is to be understood that the meeting presentation mode may be displayed in the meeting application or the meeting presentation mode may be displayed in the target application when the user selects the target meeting presentation portal in the one or more meeting presentation portals. When the meeting presentation mode is displayed in the meeting application, it means that after the computing device transmits protocol parameter information in the meeting application to the target application, a session page of the meeting application is still displayed in a terminal interface of the computing device. After the author executes a selection operation on the meeting presentation mode, the computing device may switch to displaying the session page of the meeting application as an interface of the target application in a terminal screen in response to the selection operation, and display meeting presentation prompt information in the target application. When the meeting presentation mode is displayed in the target application, it means that after the computing device transmits protocol parameter information in the meeting application to the target application, the computing device switches to displaying the session page of the meeting application as an interface of the target application in a terminal screen, and display the meeting presentation mode in the target application.

In some embodiments, the meeting presentation mode selected by the author when first enabling the target application in the meeting application may be stored in the target application. When the author subsequently enables the target application in the meeting application, the meeting presentation mode selected previously by the author may be recommended for the author, or when a count of the author consecutively selecting a certain meeting presentation mode exceeds a count threshold (for example, 3), a meeting presentation mode consecutively selected over the count threshold may be recommended for the author when the author enables the target application again. For example, if user A last selected the general presentation mode when performing meeting presentation in the browser, the general presentation mode may be recommended for user A again when performing meeting presentation in the browser.

Figure 5:
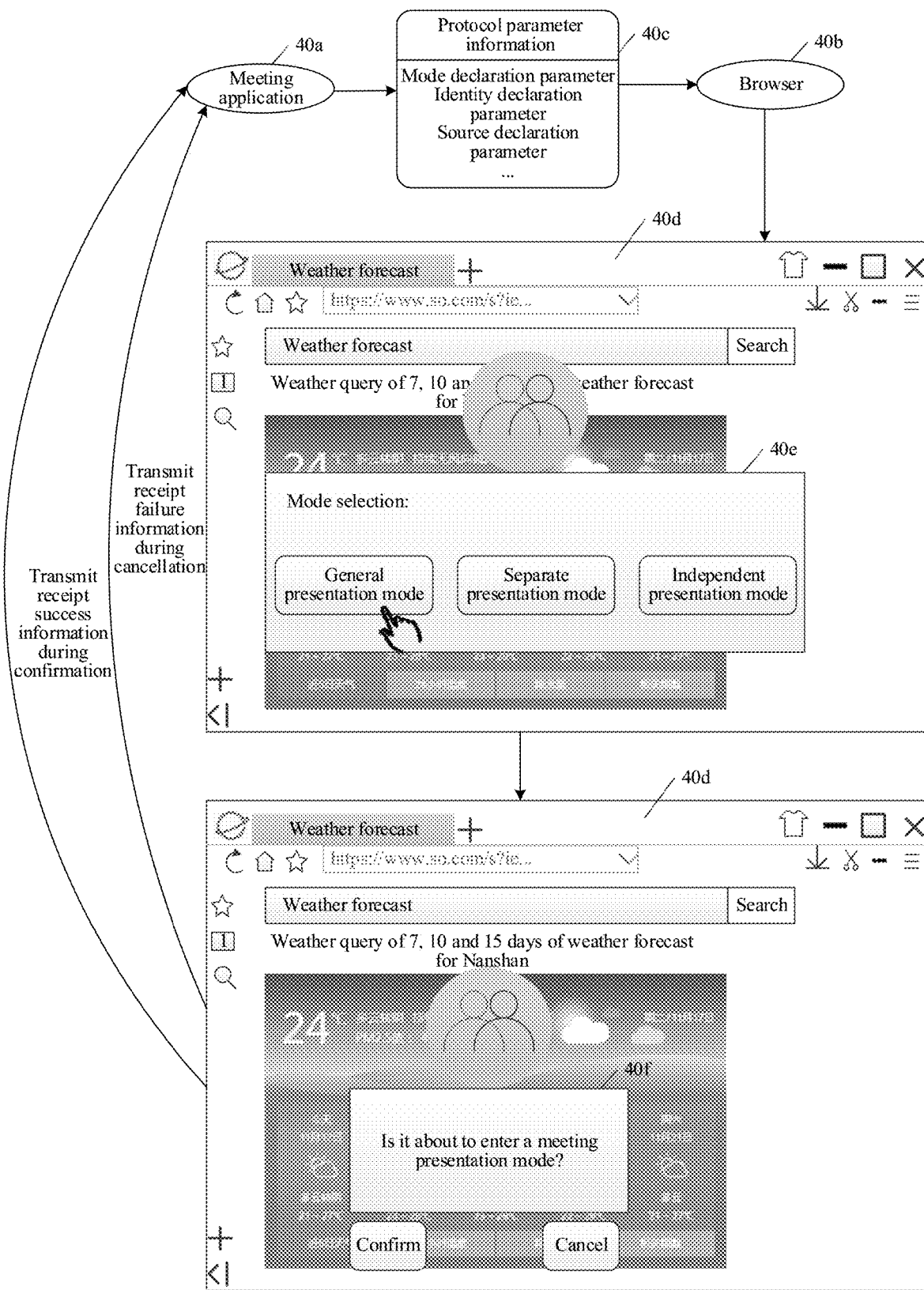
FIG. 5 is a schematic diagram of a target application generating receipt information according to certain embodiment(s) of the present disclosure.

Reference is made to FIG. 5. FIG. 5 is a schematic diagram of a target application generating receipt information according to an embodiment of the present disclosure. The process of generating receipt information by the target application is described below with an example that the target application indicated by the target meeting presentation portal is a browser. As shown in FIG. 5, a meeting application 40a and a browser 40b are installed in a computing device. When a user of the computing device executes a trigger operation on a browser presentation mode portal (which may be referred to as a target meeting presentation portal) in the meeting application 40a and confirms to share, the computing device may acquire protocol parameter information 40c corresponding to the browser presentation mode portal in the meeting application 40a, and transmit the protocol parameter information 40c from the meeting application 40a to the browser 40b. The protocol parameter information 40c may include parameter information such as a mode declaration parameter, an identity declaration parameter and a source declaration parameter.

As shown in FIG. 5, after receiving the protocol parameter information 40c, the browser 40b may identify the protocol parameter information 40c. When the browser 40b identifies that the mode declaration parameter is mode=meeting, a meeting mode may be entered. At this moment, the computing device may switch the target application 40a displayed in a terminal screen to the browser 40b. When an opened interface 40d already exists in the browser 40b, a meeting presentation mode selection page 40e may be displayed in the interface 40d of the browser 40b. The meeting presentation mode selection page 40e may include a general presentation mode, a separate presentation mode and an independent presentation mode. An author may select an appropriate meeting presentation mode according to actual situations thereof. For example, when the computing device used by the author is the own personal device, the author may select the general presentation mode for meeting presentation. When the author selects the general presentation mode in the meeting presentation mode selection page 40e, meeting presentation prompt information 40f may be displayed in the interface 40d of the browser 40b.

Further, the author may select a confirmation option corresponding to the meeting presentation prompt information 40f, and directly share and project the interface 40d in the meeting application, or may select a cancel option corresponding to the meeting presentation prompt information 40f, cancel the sharing and projection of the browser in the meeting application, execute a series of operations of closing the interface, and initiate meeting presentation again. When the author executes a confirmation operation on the meeting presentation prompt information 40f (selecting a confirmation option), the browser 40b may generate receipt success information and transmit the receipt success information to the meeting application 40a. The interface 40d in the browser 40b may be shared and projected in the meeting application 40a. When the author executes a cancel operation on the meeting presentation prompt information 40f (selecting a cancel option), the browser 40b may generate receipt failure information and transmit the receipt failure information to the meeting application 40a. The sharing and projection of the browser 40b may be canceled in the meeting application 40a.

In some embodiments, the meeting presentation prompt information may include an address input box. In response to an input operation on the address input box, an input content in the address input box is determined as a network address, a target interface content corresponding to the network address is displayed in the target application, receipt success information associated with the target interface content is generated, and the receipt success information is transmitted to the meeting application. In other words, the author may input a network address in an input box of meeting presentation prompt information, and execute a confirmation operation on the meeting presentation prompt information. A target interface corresponding to the network address may be opened in a target application, and a target interface content is displayed. At this moment, the target application may transmit receipt success information to the meeting application. The target interface content may be shared and projected in the meeting application, and contents other than the target interface content cannot be shared and projected. The network address may refer to a uniform resource locator (URL). The URL is a concise representation of a location and access method of a file available on the Internet, and is an address of a standard file on the Internet.

Figure 6:
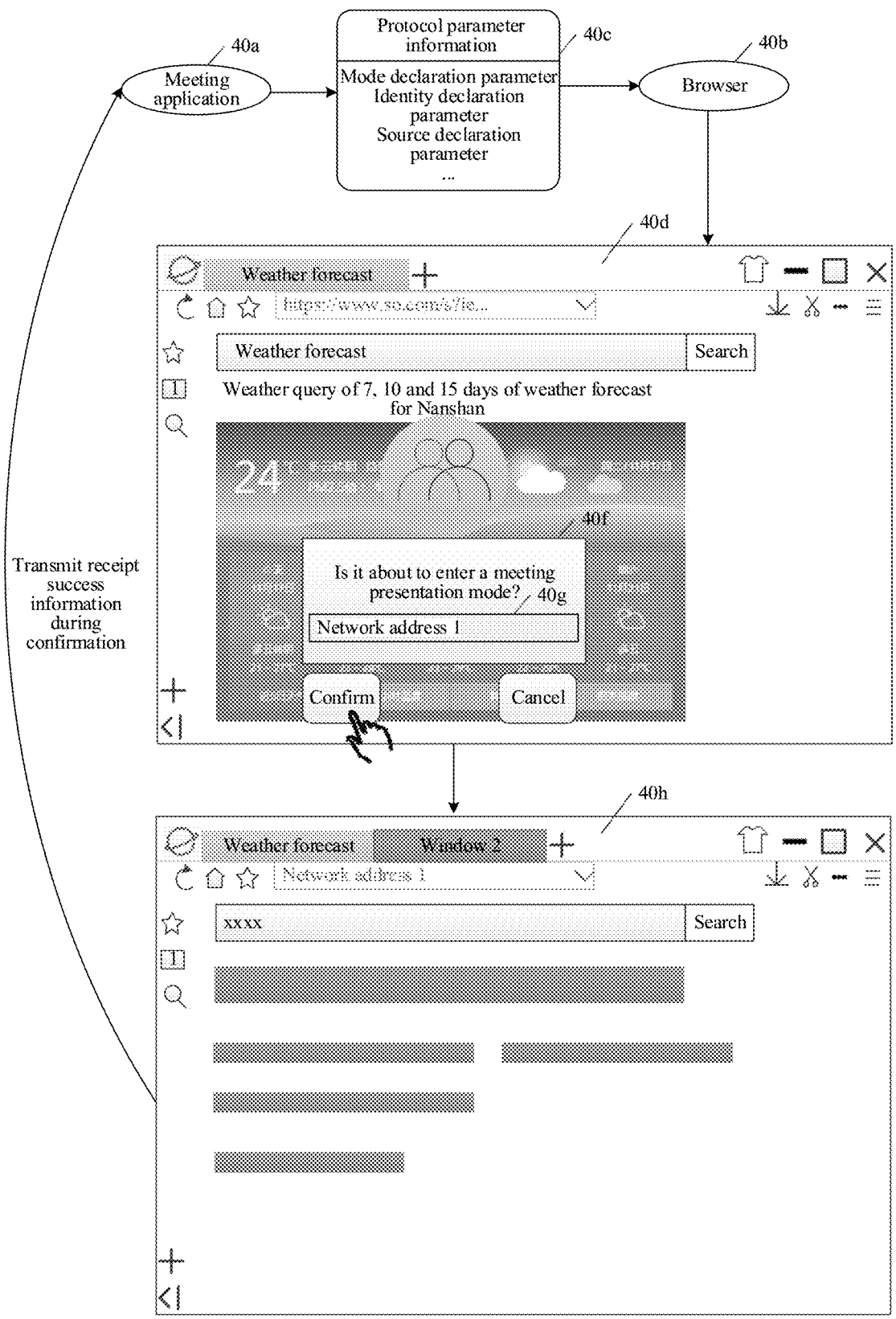
FIG. 6 is a schematic diagram of a target application generating receipt success information according to certain embodiment(s) of the present disclosure.

Reference is made to FIG. 6. FIG. 6 is a schematic diagram of a target application generating receipt success information according to an embodiment of the present disclosure. The process of generating receipt success information by the target application is described below with an example that the target application indicated by the target meeting presentation portal is a browser. As shown in FIG. 6, the meeting presentation prompt information 40f may include an address input box 40g. When an author does not input a network address in the address input box 40g and directly executes a confirmation operation or a cancel operation on the meeting presentation prompt information 40f, reference may be made to the description in the embodiment corresponding to FIG. 5 described above for the operation process. When the interface 40d in the browser 40b involves the personal privacy information of the author, the author does not desire to directly perform meeting presentation on the interface 40d. At this moment, a network address where meeting presentation is desired may be input in the address input box 40g. For example, the author may input network address 1 in the address input box 40g and select to confirm. The computing device may open an interface 40h corresponding to network address 1 in the browser 40b (a display content in the interface 40h may be referred to as a target interface content) in response to the input operation on the address input box 40g, generate receipt success information, and return the receipt success information to the meeting application 40a. The interface 40h may be shared and projected in the meeting application 40a. In this scenario, the meeting application 40a may only share and project the interface 40h in the browser 40b, and cannot share and project the interface 40d in the browser 40b.

In some embodiments, a plurality of network addresses may be input in the address input box 40g. After the author has finished inputting and has selected to confirm, the computing device may open interfaces respectively corresponding to the plurality of network addresses in the browser 40b in response to the input operation on the address input box 40g, and return receipt success information to the meeting application 40a. When the author switches to displaying the interfaces respectively corresponding to the plurality of network addresses in the browser 40b, the meeting application 40a may share and project the interfaces respectively corresponding to the plurality of network addresses.

Step S103: Share and project, in the meeting application, only a target interface content in the target application based on protocol parameters of the meeting application and the target application in response to receipt success information transmitted by the target application. The target interface content is content that the meeting application has a permission of sharing and projection.

In certain embodiment(s), after receiving the receipt success information returned by the target application, the meeting application may acquire a target interface content in the target application, and share and project the target interface content in the meeting application. In this way, when the author performs presentation in the target application, the remaining users participating in the meeting may see the presentation operation of the author in the target application in the meeting application. Data (for example, an interface content, an access trace, etc.) generated when the author performs meeting presentation in the target application may be stored into a corresponding directory of the target application. The directory storing the data is associated with the meeting presentation mode selected by the author, and data generated in different meeting presentation modes may be stored in different directories.

When the meeting presentation mode selected by the author is a general presentation mode, the computing device may create a meeting directory corresponding to the general presentation mode in a storage space of the target application according to the mode declaration parameter in the network protocol parameter. For example, the name of the meeting directory may be meeting. The shared and projected target interface content is stored into the meeting directory. Data generated by the author during the presentation is stored in the meeting directory and may be distinguished from data generated in a non-meeting presentation mode. The storage space of the target application may be a cloud storage space, a local storage space, a hard disk storage space, etc.

In some embodiments, when the meeting presentation mode selected by the author is a separate presentation mode, the computing device may create a meeting directory corresponding to the separate presentation mode in the storage space of the target application according to the mode declaration parameter in the protocol parameter information. For example, the meeting directory may be meeting. A source subdirectory corresponding to the source declaration parameter may be created in the meeting directory according to the source declaration parameter in the protocol parameter information. The shared and projected target interface content is stored to the source subdirectory. In other words, the data generated by the target application during the meeting presentation may be stored separately according to the meeting application, and different meeting applications may create different source subdirectories in the meeting directory. For example, the source subdirectory created by a xx1 meeting application in the storage space of the target application may be represented as meeting/xx1 meeting. When any user starts the target application in the xx1 meeting application to perform meeting presentation, the generated data may be stored in the subdirectory: meeting/xx1 meeting. The source subdirectory created by a xx2 meeting application in the storage space of the target application may be represented as meeting/xx2 meeting. When any user starts the target application in the xx2 meeting application to perform meeting presentation, the generated data may be stored in the subdirectory: meeting/xx2 meeting.

In some embodiments, when the meeting presentation mode selected by the author is an independent presentation mode, the computing device may create a meeting directory corresponding to the independent presentation mode in the storage space of the target application according to the mode declaration parameter in the protocol parameter information. For example, the meeting directory may be meeting. An identity subdirectory corresponding to the identity declaration parameter may be created in the meeting directory according to the identity declaration parameter in the protocol parameter information. The shared and projected target interface content is stored to the identity subdirectory. In other words, the data generated by the target application during the meeting presentation may be stored separately according to the author, and different authors may create different identity subdirectories in the meeting directory. For example, the source subdirectory created by A in the storage space of the target application may be represented as meeting/A. When A starts the target application in any one meeting application to perform meeting presentation, the generated data may be stored in the subdirectory: meeting/A. The source subdirectory created by B in the storage space of the target application may be represented as meeting/B. When B starts the target application in any one meeting application to perform meeting presentation, the generated data may be stored in the subdirectory: meeting/B. In the embodiments of the present disclosure, different meeting presentation modes may create different directories in the storage space corresponding to the target application, which is beneficial to guarantee the data security during the meeting presentation.

In some embodiments, in the process of sharing and projecting the target interface content in the target application by the meeting application, the computing device may acquire an interface content to be presented from the target application and acquire a user privacy data type in the target application according to the receipt success information returned by the target application. If there is a privacy content belonging to the user privacy data type in the interface content to be presented, the privacy content is eliminated from the interface content to be presented, the interface content to be presented from which the privacy content is eliminated is determined as the target interface content, and the target interface content is shared and projected in the meeting application. In other words, after acquiring the interface content to be presented in the target application, the computing device may determine whether the interface content to be presented contains a privacy content of the author. If it is detected that the interface content to be presented contains the privacy content, the privacy content contained in the interface content to be presented may be eliminated, and the interface content to be presented from which the privacy content is eliminated is determined as a target interface content. The target interface content may be shared and projected in the meeting application. The target interface contents seen by the remaining users (the remaining parameter users other than the author) participating in the meeting are interface contents which do not contain the privacy content. If it is detected that the interface content to be presented does not contain a privacy content, the interface content to be presented may be shared and projected directly in the meeting application. The privacy content may include a personal identity card number, a contact, purchase records, bills, and other information. In the embodiments of the present disclosure, by privacy content filtering of an interface content to be presented, the risk of user privacy data leakage can be further reduced, and the privacy of user privacy data can be improved.

Figure 7:
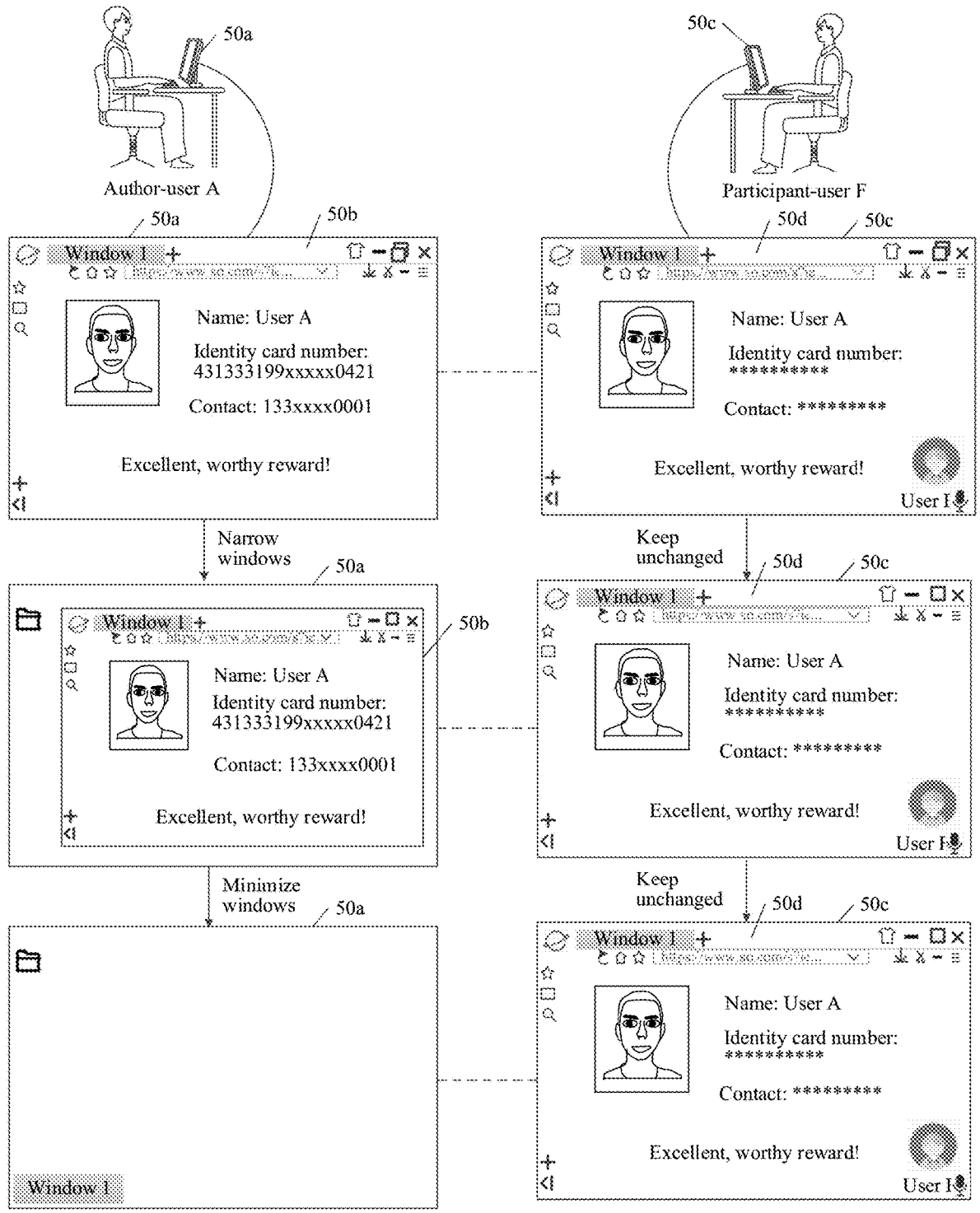
FIG. 7 is a schematic diagram of sharing and projecting a target application in a meeting application according to certain embodiment(s) of the present disclosure.

Reference is made to FIG. 7. FIG. 7 is a schematic diagram of sharing and projecting a target application in a meeting application according to an embodiment of the present disclosure. As shown in FIG. 7, the process of sharing and projection in a meeting application is described with an example that the target application is a browser. User A and user F are participants in the same meeting. User A is a user performing meeting presentation in the meeting. A terminal device used by user A is a user terminal 50*a*. User F is any participant in the meeting except user A. User F may see a shared and projected picture of user A in a meeting application. A terminal device used by user F is a user terminal 50*c*.

When user A performs meeting presentation in the browser, the user terminal 50*a* may acquire an interface content in the browser in real time, and share and project the acquired interface content in the meeting application. As shown in FIG. 7, when user A opens an interface 50*b* in the browser, the user terminal 50*a* may acquire the interface 50*b* in the browser. When the interface 50*b* contains a privacy content such as an identity card number and contact of user A, the privacy content in the interface 50*b* may be eliminated or hidden. In the meeting application of the user terminal 50*a*, the interface 50*b* from which the privacy content is eliminated or hidden may be shared and projected. At this moment, the user terminal 50*c* used by user F may display the interface 50*b* (i.e. interface 50*d*) from which the privacy content is eliminated or hidden. The interface 50*d* is displayed in the meeting application of the user terminal 50*c*. In addition, the meeting application of the user terminal 50*c* may also display information such as a portrait and a nickname of user F.

When user A narrows window 1 to which the interface 50*b* belongs in the user terminal 50*a*, the interface 50*b* from which the privacy content is eliminated or hidden is still shared and projected in the meeting application of the user terminal 50*a*. The meeting application cannot share and project the remaining terminal screen contents outside the interface 50*b*. For user F, the interface 50*d* is still displayed in the meeting application of the user terminal 50*c* until the interface 50*b* in the user terminal 50*a* changes.

When user A minimizes window 1 to which the interface 50*b* belongs in the user terminal 50*a*, the meeting application of the user terminal 50*a* cannot acquire the interface content to be shared and projected, but the meeting application is still in a meeting presentation state at this moment. For user F, the meeting application of the user terminal 50*c* may still keep the interface 50*d* at the previous moment unchanged, or may be restored as a session page of the meeting. When the meeting application of the user terminal 50*a* performs sharing and projection again, the interface content to be shared and projected by user A is displayed in the meeting application of the user terminal 50*c*.

In some embodiments, after the meeting application receives the receipt success information returned by the target application, the computing device may acquire a target interface content in the target application according to the receipt success information, and acquire a projection whitelist in the meeting application. The projection whitelist includes a network address of the meeting application having a permission of sharing and projection. If the network address corresponding to the target interface content belongs to the projection whitelist, the target interface content in the meeting application is shared and projected. If the network address corresponding to the target interface content does not belong to the projection whitelist, the sharing and projection of the target interface content is canceled in the meeting application. In other words, a projection whitelist may be pre-set in the meeting application, and only an interface content corresponding to a network address contained in the projection whitelist may be shared and projected in the meeting application. After acquiring a target interface content in the target application, the computing device determines whether the network address corresponding to the target interface content belongs to a projection whitelist, and if the network address corresponding to the target interface content belongs to the projection whitelist, the target interface content in the meeting application may be shared and projected. If the network address corresponding to the target interface content does not belong to the projection whitelist, the target interface content in the meeting application cannot be shared and projected. In the embodiments of the present disclosure, by setting a projection whitelist in a meeting application, the review of sharing and projection data can be strengthened, which is beneficial to improve the security of user data.

In some embodiments, the author may simultaneously select one or more meeting presentation portals from the meeting application, and the meeting presentation portal selected by the author is referred to as a target meeting presentation portal. That is, there may be one or more target meeting presentation portals. In the following example, there are two target meeting presentation portals. The two target meeting presentation portals respectively indicate two different target applications. That is, the target applications may include a first application and a second application. The target interface content may include a first target content and a second target content. After the meeting application receives receipt success information respectively corresponding to the first application and the second application, the computing device may acquire the first target content in the first application according to the receipt success information corresponding to the first application, and may acquire the second target content in the second application according to the receipt success information corresponding to the second application. The first target content and the second target content may be shared and projected according to a split-screen display manner in a target meeting.

Figure 8:
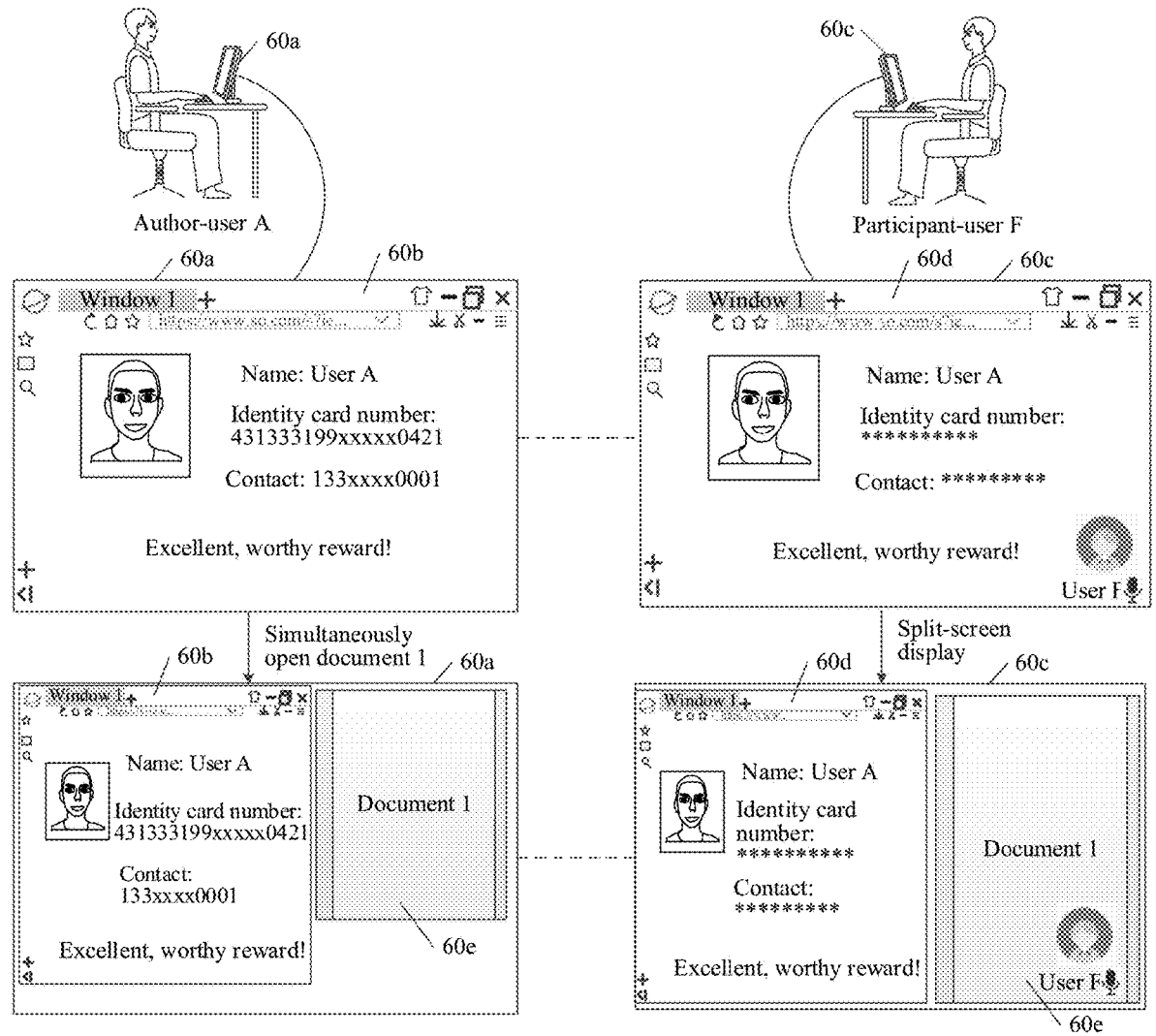
FIG. 8 is a schematic diagram of sharing and projecting a target application in a meeting application according to certain embodiment(s) of the present disclosure.

Reference is made to FIG. 8. FIG. 8 is a schematic diagram of sharing and projecting a target application in a meeting application according to an embodiment of the present disclosure. As shown in FIG. 8, the process of sharing and projection in a meeting application is described with an example that the target application includes a browser (first application) and a word office application (second application). User A and user F are participants in the same meeting. User A is a user performing meeting presentation in the meeting. A terminal device used by user A is a user terminal 60a. User F is any participant in the meeting except user A. User F may see a shared and projected picture of user A in a meeting application. A terminal device used by user F is a user terminal 60c.

For the process of sharing and projecting an interface 60b (first target content) in the user terminal 60a in the meeting application, reference may be made to the description of the process of sharing and projecting the interface 50b in the embodiment corresponding to FIG. 7 described above. Details are not described herein again. User A may narrow window 1 to which the interface 60b belongs in the user terminal 60a, and open document 1 in the word office application of the user terminal 60a. At this moment, the user terminal 60a may share and project the interface 60b from which a privacy content is eliminated or hidden and an interface 60e (second target content) corresponding to document 1 in the meeting application. For user F, a meeting application in the user terminal 60c may perform split-screen display on the interface 60b (i.e. interface 60d) from which a privacy content is eliminated or hidden and the interface 60e, and the sizes of display regions of the interface 60d and the interface 60e in the user terminal 60c may be adaptively adjusted according to actual situations of the interfaces.

In the embodiments of the present disclosure, one or more meeting presentation portals may be displayed in a meeting application. In response to a trigger operation on the one or more meeting presentation portals, a meeting presentation portal triggered by the trigger operation is determined as a target meeting presentation portal, and an application indicated by the target meeting presentation portal is determined as a target application. A target interface content in the target application may be shared and projected in the meeting application. At this moment, the meeting application does not have a permission of sharing and projecting an interface content outside the target application. It can be seen that one or more meeting presentation portals may be built in a meeting application, and a corresponding application thereof may be started via each meeting presentation portal. When a target meeting presentation portal (which may be any one of the one or more meeting presentation portals) is triggered, an interface content (i.e. content to be presented in a meeting) in a target application indicated by the target meeting presentation portal may be acquired. In the meeting application, only the interface content in the target application is shared and projected, but the interface content except the target application in a user terminal screen is not shared and projected. The privacy data in the user terminal can be protected, and the privacy of the user privacy data in the meeting presentation process can be improved. By privacy content filtering of a target interface content, the risk of user privacy data leakage can be reduced, and the security of user privacy data can be improved.

Figure 9:
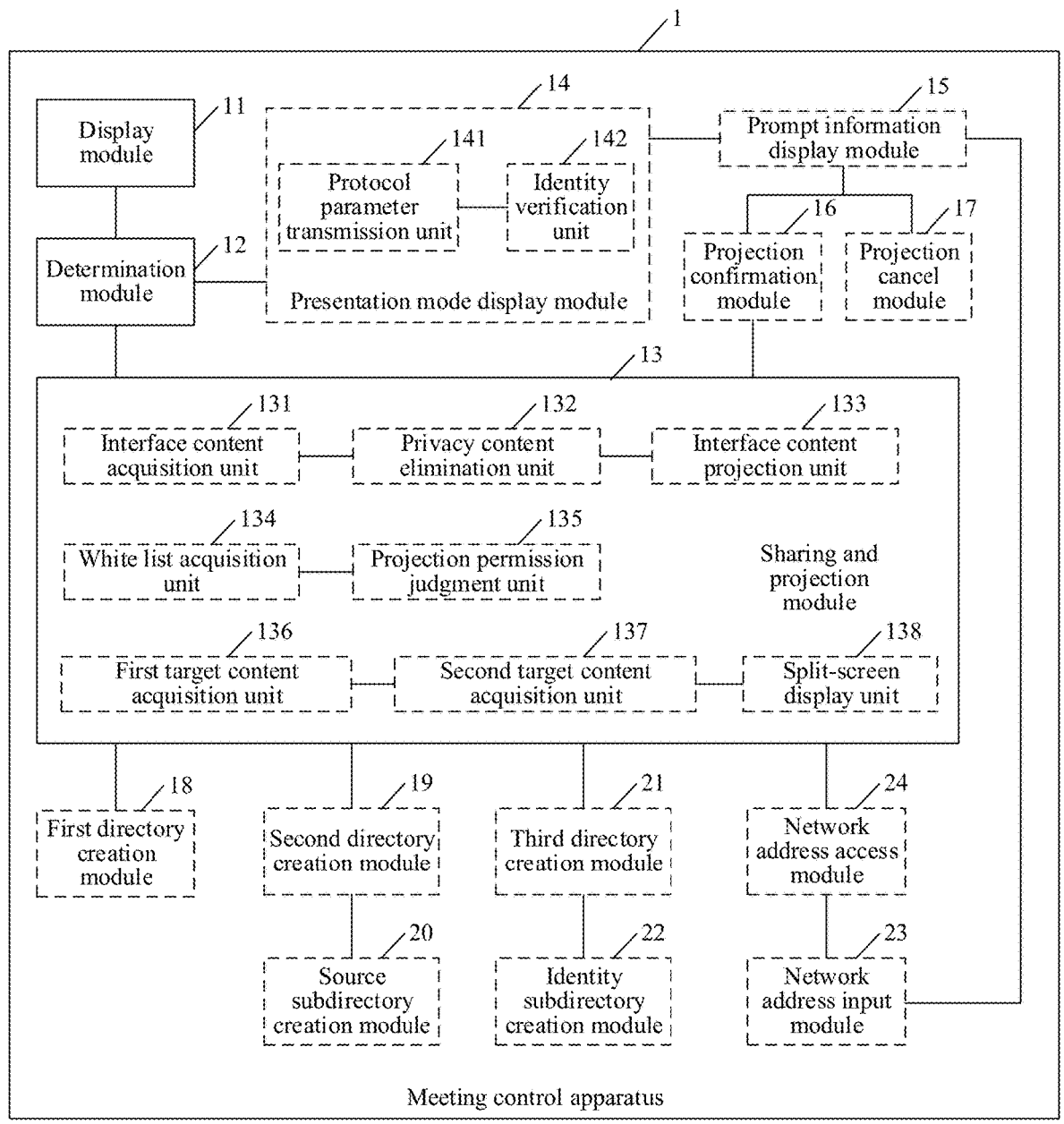
FIG. 9 is a schematic structural diagram of a meeting control apparatus according to certain embodiment(s) of the present disclosure.

Referring to FIG. 9, FIG. 9 is a schematic structural diagram of a meeting control apparatus according to an embodiment of the present disclosure. As shown in FIG. 9, the meeting control apparatus 1 may include: a display module 11, a determination module 12 and a sharing and projection module 13.

The display module 11 is configured to display one or more meeting presentation portals in a shared content selection page of a meeting application in response to an enable operation of a screen sharing function option. Each meeting presentation portal corresponds to an application other than the meeting application. The meeting application and each of the other applications pre-customize a protocol parameter for sharing and projecting each of the other applications in the meeting application.

The determination module 12 is configured to determine, in response to a trigger operation on the one or more meeting presentation portals, a meeting presentation portal triggered by the trigger operation as a target meeting presentation portal, and determine an application corresponding to the target meeting presentation portal as a target application.

The sharing and projection module 13 is configured to share and project, in the meeting application, only a target interface content in the target application based on protocol parameters of the meeting application and the target application in response to receipt success information transmitted by the target application. The target interface content is content that the meeting application has a permission of sharing and projection.

For a specific implementation of functions of the display module 11, the determining module 12, and the shared screen projection module 13, reference may be made to step S101 to step S103 in the embodiment corresponding to FIG. 3, and details are not described herein again.

In some feasible implementations, the meeting control apparatus 1 may further include: a presentation mode display module 14, a prompt information display module 15, a projection confirmation module 16, and a projection cancel module 17.

The presentation mode display module 14 is configured to display a meeting presentation mode associated with the target meeting presentation portal in the target application.

The prompt information display module 15 is configured to display meeting presentation prompt information in the target application in response to a selection operation on the meeting presentation mode. The meeting presentation prompt information is used for prompting a user to confirm an information security state of an opened page in the target application.

The projection confirmation module 16 is configured to generate receipt success information in the target application in response to a confirmation operation on the meeting presentation prompt information, and transmit the receipt success information to the meeting application.

The sharing and projection module 13 is further configured to:

acquire a target interface content in the target application according to the receipt success information, and share and project the target interface content in the meeting application.

The projection cancel module 17 is configured to generate receipt failure information in the target application in response to a cancel operation on the meeting presentation prompt information, transmit the receipt failure information to the meeting application, and cancel the sharing and projection of the target application in the meeting application.

For specific function implementations of the sharing and projection module 13, the presentation mode display module 14, the prompt information display module 15, the projection confirmation module 16, and the projection cancel module 17, reference may be made to step S102 in the embodiment corresponding to FIG. 3 described above. Details are not described herein again.

In some feasible implementations, the presentation mode display module 14 may include: a protocol parameter transmission unit 141 and an identity verification unit 142.

The protocol parameter transmission unit 141 is configured to acquire protocol parameter information corresponding to the target meeting presentation portal in the meeting application, and transmit the protocol parameter information to the target application.

The identity verification unit 142 is configured to display a meeting presentation mode associated with the target meeting presentation portal in the target application when or in response to determining that the target application determines, according to the protocol parameter information, that the meeting application has a permission of sharing and projection.

For a specific functional implementation of the protocol parameter transmission unit 141 and the identity confirmation unit 142, reference may be made to step S102 in the embodiment corresponding to FIG. 3, and details are not described herein again.

In some feasible implementations, the meeting presentation mode includes a general presentation mode.

The meeting control apparatus 1 may further include: a first directory creation module 18.

The first directory creation module 18 is configured to create a meeting directory corresponding to the general presentation mode in a storage space of the target application according to a mode declaration parameter in the protocol parameter information, and store the shared and projected target interface content to the meeting directory.

The meeting presentation mode includes a separate presentation mode.

The meeting control apparatus 1 may further include: a second directory creation module 19 and a source subdirectory creation module 20.

The second directory creation module 19 is configured to create a meeting directory corresponding to the separate presentation mode in a storage space of the target application according to a mode declaration parameter in the protocol parameter information.

The source subdirectory creation module 20 is configured to create, according to a source declaration parameter in the protocol parameter information, a source subdirectory corresponding to the source declaration parameter in the meeting directory, and store the shared and projected target interface content to the source subdirectory.

The meeting presentation mode includes an independent presentation mode.

The meeting control apparatus 1 may further include: a third directory creation module 21 and an identity subdirectory creation module 22.

The third directory creation module 21 is configured to create a meeting directory corresponding to the independent presentation mode in a storage space of the target application according to a mode declaration parameter in the protocol parameter information.

The identity subdirectory creation module 22 is configured to create, according to an identity declaration parameter in the protocol parameter information, an identity subdirectory corresponding to the identity declaration parameter in the meeting directory, and store the shared and projected target interface content to the identity subdirectory.

For specific function implementations of the first directory creation module 18, the second directory creation module 19, the source subdirectory creation module 20, the third directory creation module 21, and the identity subdirectory creation module 22, reference may be made to step S103 in the embodiment corresponding to FIG. 3 described above. Details are not described herein again.

In some feasible implementations, the meeting presentation prompt information may include an address input box.

The meeting control apparatus 1 may include: a network address input module 23 and a network address access module 24.

The network address input module 23 is configured to determine an input content in the address input box as a network address in response to an input operation on the address input box.

The network address access module 24 is configured to display a target interface content corresponding to the network address in the target application, generate receipt success information associated with the target interface content, and transmit the receipt success information to the meeting application.

In some embodiments, the input content in the address input box may include a plurality of network addresses. Interfaces respectively corresponding to the plurality of network addresses are opened in the target application.

The sharing and projection module 13 is further configured to share and project the interfaces respectively corresponding to the plurality of network addresses in response to switching to displaying the interfaces respectively corresponding to the plurality of network addresses in the target application.

For specific function implementations of the network address input module 23 and the network address access module 24, reference may be made to step S102 in the embodiment corresponding to FIG. 3 described above. Details are not described herein again.

In some feasible implementations, the sharing and projection module 13 may include: an interface content acquisition unit 131, a privacy content elimination unit 132 and an interface content projection unit 133.

The interface content acquisition unit 131 is configured to acquire an interface content to be presented in the target application according to the receipt success information, and acquire a user privacy data type in the target application.

The privacy content elimination unit 132 is configured to eliminate, in response to the interface content to be presented having a privacy content belonging to the user privacy data type, the privacy content from the interface content to be presented.

The interface content projection unit 133 is configured to determine the interface content to be presented from which the privacy content is eliminated as the target interface content, and share and project the target interface content in the meeting application.

In some feasible implementations, the sharing and projection module 13 may include: a whitelist acquisition unit 134 and a projection permission determining unit 135.

The whitelist acquisition unit 134 is configured to acquire a target interface content in the target application according to the receipt success information, and acquire a projection whitelist in the meeting application. The projection whitelist includes a network address of the meeting application having a permission of sharing and projection.

The projection permission determining unit 135 is configured to share and project the target interface content in the meeting application in response to the network address corresponding to the target interface content belonging to the projection whitelist.

The projection permission determining unit 135 is further configured to cancel the sharing and projection of the target interface content in the meeting application in response to the network address corresponding to the target interface content not belonging to the projection whitelist.

In some feasible implementations, the target application includes a first application and a second application, and the target interface content includes a first target content in the first application and a second target content in the second application.

The sharing and projection module 13 may include: a first target content acquisition unit 136, a second target content acquisition unit 137 and a split-screen display unit 138.

The first target content acquisition unit 136 is configured to acquire the first target content in the first application according to receipt success information corresponding to the first application.

The second target content acquisition unit 137 is configured to acquire the second target content in the second application according to receipt success information corresponding to the second application.

The split-screen display unit 138 is configured to share and project the first target content and the second target content according to a split-screen display manner in a target meeting.

For specific function implementations of the interface content acquisition unit 131, the privacy content elimination unit 132, the interface content projection unit 133, the whitelist acquisition unit 134, the projection permission determining unit 135, the first target content acquisition unit 136, the second target content acquisition unit 137, and the split-screen display unit 138, reference may be made to step S103 in the embodiment corresponding to FIG. 3 described above. Details are not described herein again.

In the embodiments of the present disclosure, one or more meeting presentation portals may be displayed in a meeting application. In response to a trigger operation on the one or more meeting presentation portals, a meeting presentation portal triggered by the trigger operation is determined as a target meeting presentation portal, and an application indicated by the target meeting presentation portal is determined as a target application. A target interface content in the target application may be shared and projected in the meeting application. At this moment, the meeting application does not have a permission of sharing and projecting an interface content outside the target application. It can be seen that one or more meeting presentation portals may be built in a meeting application, and a corresponding application thereof may be started via each meeting presentation portal. When a target meeting presentation portal (which may be any one of the one or more meeting presentation portals) is triggered, an interface content (i.e. content to be presented in a meeting) in a target application indicated by the target meeting presentation portal may be acquired. In the meeting application, only the interface content in the target application is shared and projected, but the interface content except the target application in a user terminal screen is not shared and projected. The privacy data in the user terminal can be protected, and the privacy of the user privacy data in the meeting presentation process can be improved. By privacy content filtering of a target interface content, the risk of user privacy data leakage can be reduced, and the security of user privacy data can be improved.

Figure 10:
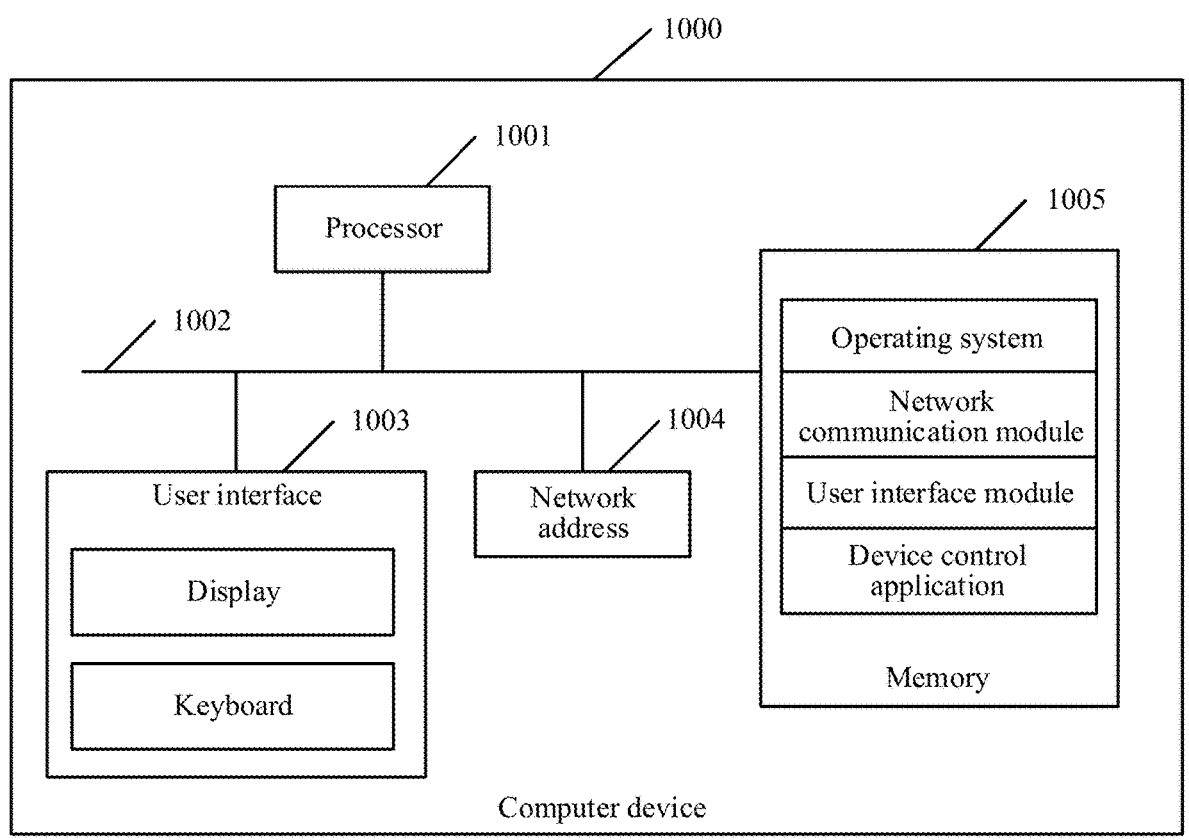
FIG. 10 is a schematic structural diagram of a computing device according to certain embodiment(s) of the present disclosure.

FIG. 10 is a schematic structural diagram of a computing device according to an embodiment of the present disclosure. As shown in FIG. 10, the computing device 1000 may include: a processor 1001, a network interface 1004 and a memory 1005. In addition, the above computing device 1000 may further include: a user interface 1003 and one or more communication buses 1002. The communication bus 1002 is configured to implement connection and communication between the components. The user interface 1003 may include a display and a keyboard. In certain embodiment(s), the user interface 1003 may further include a standard wired interface and a wireless interface. In some embodiments, the network interface 1004 may include a standard wired interface and a wireless interface (such as a WiFi interface). The memory 1005 may be a high-speed RAM, or may be a non-volatile memory, for example, one or more disk memory. In some embodiments, the memory 1005 may further be one or more storage apparatuses that are located away from the processor 1001. As shown in FIG. 10, the memory 1005 used as a computer-readable storage medium may include an operating system, a network communication module, a user interface module, and a device-control application program.

In the computing device 1000 shown in FIG. 10, the network interface 1004 may provide a network communication function; the user interface 1003 is configured to provide an input interface for the user; and the processor 1001 may be configured to call a device control application stored in the memory 1005 to: display one or more meeting presentation portals in a shared content selection page of a meeting application in response to an enable operation of a screen sharing function option, each meeting presentation portal corresponding to an application other than the meeting application, the meeting application and each of the other applications pre-customizing a protocol parameter for sharing and projecting each of the other applications in the meeting application; determine, in response to a trigger operation on the one or more meeting presentation portals, a meeting presentation portal triggered by the trigger operation as a target meeting presentation portal, and determine an application corresponding to the target meeting presentation portal as a target application; and share and project, in the meeting application, only a target interface content in the target application based on protocol parameters of the meeting application and the target application in response to receipt success information transmitted by the target application, the target interface content being content that the meeting application has a permission of sharing and projection.

It is to be understood that, the computing device 1000 described in this embodiment of the present disclosure may implement the descriptions of the meeting control method in the embodiments corresponding to FIG. 3, or the descriptions of the meeting control apparatus 1 in the embodiment corresponding to FIG. 9. Details are not described herein again. In addition, the description of beneficial effects of the same method is not described herein again.

In addition, an embodiment of the present disclosure further provides a computer-readable storage medium. The computer-readable storage medium stores a computer program executed by the meeting control apparatus 1 mentioned above, and the computer program includes a program instruction. When executing the program instruction, the processor can perform the descriptions of the meeting control method in the embodiment corresponding to FIG. 3. Therefore, details are not described herein again. In addition, the description of beneficial effects of the same method is not described herein again. For technical details that are not disclosed in the embodiments of the computer-readable storage medium of the present disclosure, refer to the method embodiments of the present disclosure. In an example, the program instructions may be deployed to be executed on a computing device, or deployed to be executed on a plurality of computing devices at the same location, or deployed to be executed on a plurality of computing devices that are distributed in a plurality of locations and interconnected by a communication network. A blockchain system may be composed of a plurality of computing devices distributed in a plurality of locations and interconnected by a communication network.

In addition, the embodiments of the present disclosure further provide a computer program product or a computer program. The computer program product or the computer program may include computer instructions, the computer instructions may be stored in a computer-readable storage medium. A processor of a computing device reads the computer instructions from the computer-readable storage medium and may execute the computer instructions to cause the computing device to perform the description of the meeting control method in the embodiment corresponding to FIG. 3, and therefore, details are not repeated herein. In addition, the description of beneficial effects of the same method is not described herein again. For technical details that are not disclosed in the computer program product or computer program embodiments involved in the present disclosure, reference may be made to the descriptions of the method embodiments of the present disclosure.

For ease of description in the method embodiments, each method is described as a combination of a series of operations. However, a person skilled in the art understands that the present disclosure is not limited to the order of the described operations because some steps according to the present disclosure may occur in other order or occur in parallel. In addition, a person skilled in the art is also to learn that the embodiments described in the present disclosure are all exemplary embodiments, and the involved actions and modules are not necessarily required to the present disclosure.

A sequence of the steps of the method in the embodiments of the present disclosure may be adjusted, and certain steps may also be combined or removed according to an implementation.

The modules in the apparatus in the embodiments of the present disclosure may be combined, divided, and deleted according to an implementation.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

A person skilled in the art may understand that all or some of the procedures of the methods of the embodiments may be implemented by a computer program instructing relevant hardware. The computer program may be stored in a computer-readable storage medium. When the program is executed, the procedures of the method embodiments may be implemented. The storage medium may be a magnetic disc, an optical disc, a read-only memory (ROM), or a random access memory (RAM).

What are disclosed above are merely examples of embodiments of the present disclosure, and are not intended to limit the protection scope of the present disclosure. Therefore, equivalent variations made in accordance with the claims of the present disclosure shall fall within the scope of the present disclosure.

What is claimed is:

1. A meeting control method, performed by a computing device, the method comprising:

displaying, during an on-going virtual meeting session in a meeting application, one or more meeting presentation portals in a shared content selection page of the meeting application in response to an enable operation of a screen sharing function option provided by the meeting application, each meeting presentation portal corresponding to an application other than the meeting application, the meeting application and each of the other applications pre-customizing a protocol parameter for sharing and projecting a screen content of each of the other applications in the meeting application;

determining, in response to a trigger operation on the one or more meeting presentation portals, a meeting presentation portal triggered by the trigger operation as a target meeting presentation portal, and determining an application corresponding to the target meeting presentation portal as a target application by selecting a meeting presentation mode in a plurality of meeting presentation modes as a target meeting presentation mode;

in response to selecting the meeting presentation mode as the target meeting presentation mode, determining protocol parameters of the meeting application;

creating, based on the protocol parameters, a meeting directory corresponding to the target meeting presentation mode, and storing a target interface content of the target application in the corresponding meeting directory, wherein each different target meeting presentation mode corresponds to different meeting directory creation manners; and sharing and projecting, in the meeting application, only the target interface content in the target application based on the protocol parameters of the meeting application and the target application in response to receipt success information transmitted by the target application, the target interface content being content that the meeting application has a permission of sharing and projection.

2. The method according to claim 1, further comprising:
displaying a meeting presentation mode associated with the target meeting presentation portal in the target application;
displaying meeting presentation prompt information in the target application in response to a selection operation on the meeting presentation mode, the meeting presentation prompt information being used for prompting a user to confirm an information security state of an opened page in the target application; and
generating receipt success information in the target application in response to a confirmation operation on the meeting presentation prompt information, and transmitting the receipt success information to the meeting application,
wherein sharing and projecting only the target interface content comprises:
acquiring a target interface content in the target application according to the receipt success information, and sharing and projecting the target interface content in the meeting application.

3. The method according to claim 2, wherein displaying the meeting presentation mode comprises:
acquiring protocol parameter information corresponding to the target meeting presentation portal in the meeting application, and transmitting the protocol parameter information to the target application; and
displaying a meeting presentation mode associated with the target meeting presentation portal in the target application in response to determining that the target application determines, according to the protocol parameter information, that the meeting application has a permission of sharing and projection.

4. The method according to claim 2, further comprising:
generating receipt failure information in the target application in response to a cancel operation on the meeting presentation prompt information, transmitting the receipt failure information to the meeting application, and canceling the sharing and projection of the target application in the meeting application.

5. The method according to claim 2, wherein the meeting presentation mode includes a general presentation mode;
the method further comprises:
creating a meeting directory corresponding to the general presentation mode in a storage space of the target application according to a mode declaration parameter in the protocol parameter information, and storing the shared and projected target interface content to the meeting directory.

6. The method according to claim 2, wherein the meeting presentation mode includes a separate presentation mode;
the method further comprises:
creating a meeting directory corresponding to the separate presentation mode in a storage space of the target application according to a mode declaration parameter in the protocol parameter information; and
creating, according to a source declaration parameter in the protocol parameter information, a source subdirectory corresponding to the source declaration parameter in the meeting directory, and storing the shared and projected target interface content to the source subdirectory.

7. The method according to claim 2, wherein the meeting presentation mode includes an independent presentation mode;
the method further comprises:
creating a meeting directory corresponding to the independent presentation mode in a storage space of the target application according to a mode declaration parameter in the protocol parameter information; and
creating, according to an identity declaration parameter in the protocol parameter information, an identity subdirectory corresponding to the identity declaration parameter in the meeting directory, and storing the shared and projected target interface content to the identity subdirectory.

8. The method according to claim 2, wherein the meeting presentation prompt information includes an address input box;
the method further comprises:
determining an input content in the address input box as a network address in response to an input operation on the address input box; and
displaying a target interface content corresponding to the network address in the target application, generating receipt success information associated with the target interface content, and transmitting the receipt success information to the meeting application.

9. The method according to claim 8, wherein the input content in the address input box includes a plurality of network addresses; interfaces respectively corresponding to the plurality of network addresses are opened in the target application;
the method further comprises:
sharing and projecting, by the meeting application, the interfaces respectively corresponding to the plurality of network addresses in response to switching to displaying the interfaces respectively corresponding to the plurality of network addresses in the target application.

10. The method according to claim 2, wherein acquiring the target interface content comprises:
acquiring an interface content to be presented in the target application according to the receipt success information, and acquiring a user privacy data type in the target application;
eliminating, in response to the interface content to be presented having a privacy content belonging to the user privacy data type, the privacy content from the interface content to be presented; and
determining the interface content to be presented from which the privacy content is eliminated as the target interface content, and sharing and projecting the target interface content in the meeting application.

11. The method according to claim 2, wherein acquiring the target interface content comprises:
acquiring a target interface content in the target application according to the receipt success information, and acquiring a projection whitelist in the meeting application, the projection whitelist including a network address of the meeting application having a permission of sharing and projection;
sharing and projecting the target interface content in the meeting application in response to the network address corresponding to the target interface content belonging to the projection whitelist; and
canceling the sharing and projection of the target interface content in the meeting application in response to the network address corresponding to the target interface content not belonging to the projection whitelist.

12. The method according to claim 2, wherein the target application includes a first application and a second application, and the target interface content includes a first target content of the first application and a second target content of the second application;

acquiring the target interface content comprises:
acquiring the first target content in the first application according to receipt success information corresponding to the first application;
acquiring the second target content in the second application according to receipt success information corresponding to the second application; and
sharing and projecting the first target content and the second target content according to a split-screen display manner in a target meeting.

13. A meeting control apparatus, comprising: a memory storing computer program instructions; and a processor coupled to the memory and configured to execute the computer program instructions and perform:

displaying, during an on-going virtual meeting session in a meeting application, one or more meeting presentation portals in a shared content selection page of the meeting application in response to an enable operation of a screen sharing function option provided by the meeting application, each meeting presentation portal corresponding to an application other than the meeting application, the meeting application and each of the other applications pre-customizing a protocol parameter for sharing and projecting a screen content of each of the other applications in the meeting application;

determining, in response to a trigger operation on the one or more meeting presentation portals, a meeting presentation portal triggered by the trigger operation as a target meeting presentation portal, and determining an application corresponding to the target meeting presentation portal as a target application by selecting a meeting presentation mode in a plurality of meeting presentation modes as a target meeting presentation mode;

in response to selecting the meeting presentation mode as the target meeting presentation mode, determining protocol parameters of the meeting application;

creating, based on the protocol parameters, a meeting directory corresponding to the target meeting presentation mode, and storing a target interface content of the target application, wherein each different target meeting presentation mode corresponds to different meeting directory creation manners; and sharing and projecting, in the meeting application, only the target interface content in the target application based on the protocol parameters of the meeting application and the target application in response to receipt success information transmitted by the target application, the target interface content being content that the meeting application has a permission of sharing and projection.

14. The meeting control apparatus according to claim 13, wherein the processor is further configured to execute the computer program instructions and perform:

displaying a meeting presentation mode associated with the target meeting presentation portal in the target application;

displaying meeting presentation prompt information in the target application in response to a selection operation on the meeting presentation mode, the meeting presentation prompt information being used for prompting a user to confirm an information security state of an opened page in the target application; and generating receipt success information in the target application in response to a confirmation operation on the meeting presentation prompt information, and transmitting the receipt success information to the meeting application, wherein sharing and projecting only the target interface content includes:
acquiring a target interface content in the target application according to the receipt success information, and sharing and projecting the target interface content in the meeting application.

15. The meeting control apparatus according to claim 14, wherein displaying the meeting presentation mode includes:

acquiring protocol parameter information corresponding to the target meeting presentation portal in the meeting application, and transmitting the protocol parameter information to the target application; and displaying a meeting presentation mode associated with the target meeting presentation portal in the target application in response to determining that the target application determines, according to the protocol parameter information, that the meeting application has a permission of sharing and projection.

16. The meeting control apparatus according to claim 14, wherein the processor is further configured to execute the computer program instructions and perform:

generating receipt failure information in the target application in response to a cancel operation on the meeting presentation prompt information, transmitting the receipt failure information to the meeting application, and canceling the sharing and projection of the target application in the meeting application.

17. The meeting control apparatus according to claim 14, wherein the meeting presentation mode includes a separate presentation mode, and the processor is further configured to execute the computer program instructions and perform:

creating a meeting directory corresponding to the separate presentation mode in a storage space of the target application according to a mode declaration parameter in the protocol parameter information; and creating, according to a source declaration parameter in the protocol parameter information, a source subdirectory corresponding to the source declaration parameter in the meeting directory, and storing the shared and projected target interface content to the source subdirectory.

18. The meeting control apparatus according to claim 14, wherein the meeting presentation mode includes an independent presentation mode, and the processor is further configured to execute the computer program instructions and perform:

creating a meeting directory corresponding to the independent presentation mode in a storage space of the target application according to a mode declaration parameter in the protocol parameter information; and creating, according to an identity declaration parameter in the protocol parameter information, an identity subdirectory corresponding to the identity declaration parameter in the meeting directory, and storing the shared and projected target interface content to the identity subdirectory.

19. A non-transitory computer-readable storage medium storing computer program instructions executable by at least one processor to perform:

displaying, during an on-going virtual meeting session in a meeting application, one or more meeting presentation portals in a shared content selection page of the meeting application in response to an enable operation of a screen sharing function option provided by the meeting application, each meeting presentation portal corresponding to an application other than the meeting application, the meeting application and each of the other applications pre-customizing a protocol parameter for sharing and projecting a screen content of each of the other applications in the meeting application;

determining, in response to a trigger operation on the one or more meeting presentation portals, a meeting presentation portal triggered by the trigger operation as a target meeting presentation portal, and determining an application corresponding to the target meeting presentation portal as a target application by selecting a meeting presentation mode in a plurality of meeting presentation modes as a target meeting presentation mode;

in response to selecting the meeting presentation mode as the target meeting presentation mode, determining protocol parameters of the meeting application;

creating, based on the protocol parameters, a meeting directory corresponding to the target meeting presentation mode, and storing a target interface content of the target application, wherein each different target meeting presentation mode corresponds to different meeting directory creation manners; and sharing and projecting, in the meeting application, only the target interface content in the target application based on the protocol parameters of the meeting application and the target application in response to receipt success information transmitted by the target application, the target interface content being content that the meeting application has a permission of sharing and projection.

* * * * *